(12) United States Patent
Bendig

(10) Patent No.: US 8,316,350 B2
(45) Date of Patent: Nov. 20, 2012

(54) INTERFACE VERSIONING

(75) Inventor: Oliver Bendig, Forst (DE)

(73) Assignee: SAP Aktiengesellschaft, Walldorf (DE)

( * ) Notice: Subject to any disclaimer, the term of this patent is extended or adjusted under 35 U.S.C. 154(b) by 1035 days.

(21) Appl. No.: 12/275,107

(22) Filed: Nov. 20, 2008

(65) Prior Publication Data

US 2010/0125831 A1    May 20, 2010

(51) Int. Cl.
    *G06F 9/44*    (2006.01)
(52) U.S. Cl. .......................... 717/120; 717/116; 717/170
(58) Field of Classification Search .................. 717/100, 717/114–123, 170
    See application file for complete search history.

(56) References Cited

U.S. PATENT DOCUMENTS

| | | | | |
|---|---|---|---|---|
| 5,918,052 | A * | 6/1999 | Kruskal et al. ................. | 717/100 |
| 6,415,435 | B1 * | 7/2002 | McIntyre ....................... | 717/108 |
| 6,643,711 | B2 * | 11/2003 | Bracha et al. .................. | 719/315 |
| 6,651,248 | B1 * | 11/2003 | Alpern ........................... | 717/162 |
| 8,001,523 | B1 * | 8/2011 | Wiltamuth et al. ............ | 717/114 |
| 2002/0107996 | A1 * | 8/2002 | Bracha et al. .................. | 709/315 |
| 2004/0015822 | A1 * | 1/2004 | Linton et al. ................... | 717/104 |

OTHER PUBLICATIONS

Lavender, Greg, "Java Tutorial—Extending Classes and Interfaces," Jun. 15, 1999, slides 1-12.*
"The Java™ Tutorials—Learning the Java Language," <http://docs.oracle.com/javase/tutorial/>, Aug. 3, 2006, Oracle, p. 1-136.*

* cited by examiner

*Primary Examiner* — Wei Zhen
*Assistant Examiner* — Qing Chen
(74) *Attorney, Agent, or Firm* — Blakely, Sokoloff, Taylor & Zafman LLP

(57) ABSTRACT

A system and method of interface visioning to improve extendibility and flexibility in modular software design. A first super class implements a first interface. A second super class implements both a first interface and a second interface. Each super class has a unique version designation. An access class is instantiated when a feature using an interface is requested. The access class identifies from the feature the version designation and provides access to the appropriate interface through either the first super class or the second super class.

9 Claims, 2 Drawing Sheets

INTERFACE VERSIONING

FIELD OF INVENTION

Embodiments of the invention relate to increasing the flexibility and extensibility of modular software design. More specifically, embodiments of the invention relate to interface versioning.

BACKGROUND

Software designers often use modular components to provide flexibility and extensibility of the design software. As a result of the modular construction, each component can be replaced or enlarged in functionality by new components. Unfortunately, the interface for each component must be defined in advance and cannot be changed afterwards. The interfaces for each component are defined during the design phase of the software. During implementation and testing, those interfaces may be modified, but once the interface is deployed, changes to the interface are no longer possible. For example, once the interface is deployed, a customer may have implemented the interface and created new components that use the interface. If the interface later changes, the implementation of the customer would fail.

It is possible to mitigate this problem by permitting new parameters that can be added to the interface, but must be flagged as optional. This permits old implementations to ignore the new parameters and allows new implementations to use them. Additionally, new methods may be added to the interface, but calling instances must address that the new method might not be implemented by an old class implementing the interface. As a result, very careful error handling is required.

SUMMARY

A system and method of interface versioning to improve extendibility and flexibility in modular software design is disclosed. A first super class implements a first interface. A second super class implements both a first interface and a second interface. Each super class has a unique version designation. An access class is instantiated when a feature using an interface is requested. The access class identifies from the feature the version designation and provides access to the appropriate interface through either the first super class or the second super class.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
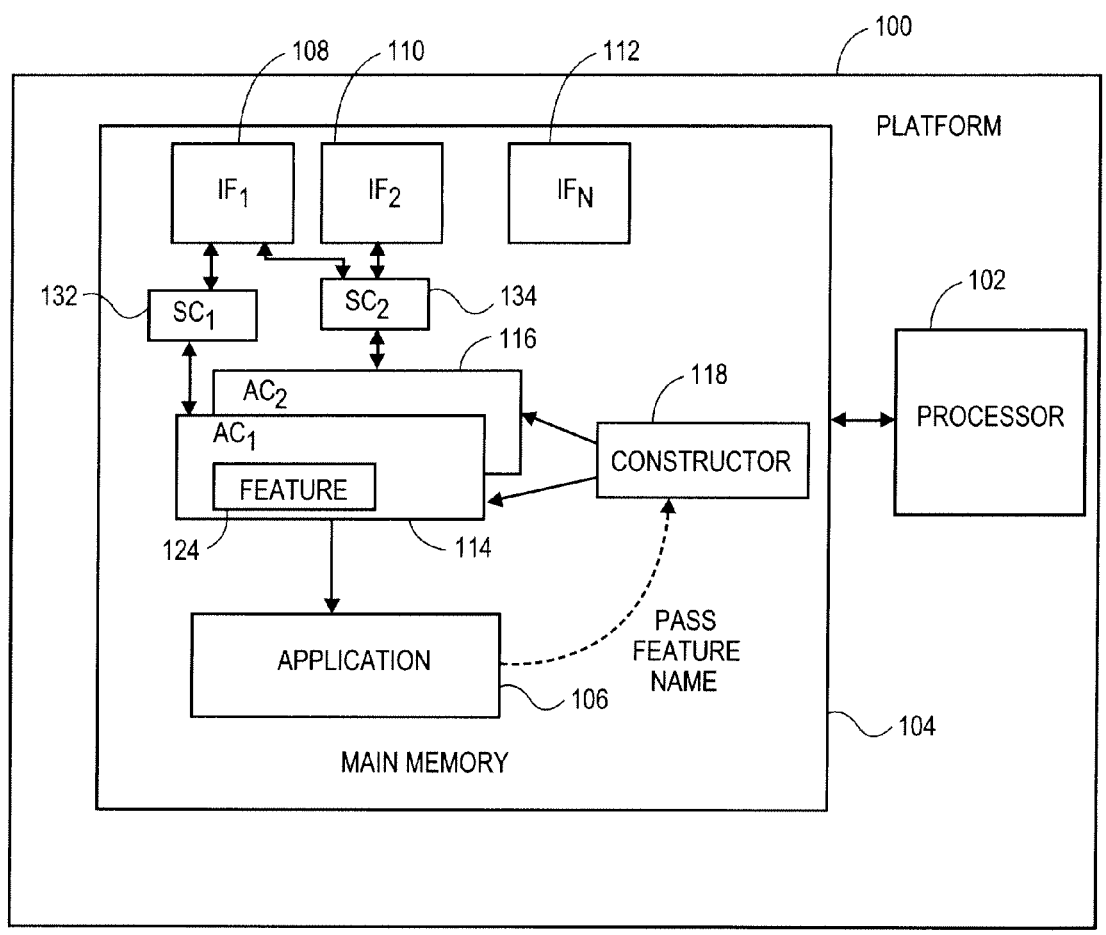
FIG. 1 is a block diagram of a system of one embodiment of the invention.

FIG. 1 is a block diagram of a system of one embodiment of the invention. A platform 100 includes a processor 102 and a main memory 104 with which the processor 102 communicates. As used herein, a "platform" includes, but is not limited or restricted to a computer (e.g., desktop, a laptop, a server, a workstation, a personal digital assistant, etc.) or any peripherals associated therewith; communication equipment (e.g., telephone handset, pager, etc.); a television set-top box and the like.

An application 106 may execute on the processor 102 from main memory 104. Application may use methods and obtain data through one or more interfaces, such as interface$_1$ 108, interface$_2$ 110 and interface$_N$ 112. In one embodiment, for example, interface 108 is a first version of an interface while interface$_2$ 110 is a second version of that interface.

Interface 110 may have additional methods and parameters and need not be backward compatible. Using the embodiment described below, complex error handling and incompatibility are nevertheless avoided. Interface$_1$ 108 is implemented by a first super class, 132. Interface$_2$ 110 may be a second version of the interface. However, to ensure backward compatibility at the system (rather than the interface), super class$_2$ 134 implements interface 108 and interface 110.

When application 106 (or other component) seeks to use a feature, it passes the name of the feature to a constructor 118 which instantiates an access class 114 or 116 to encapsulate the feature object 124. The access class identifies from the feature object 124, which interface, e.g., 108, 110, 112 the feature object 124 needs to use and provides access to the interface via the corresponding super class 132, 134.

In one embodiment, the super class 132, 134 includes a version designation as a static attribute. The feature object inherits the version designation as a static attribute from the super class. In this manner, the access class can identify from the attributes of the feature object which super class must be accessed.

Notably, end user, e.g., application 106 need not know what interfaces 108, 110 have been implemented nor what version of a feature 124 will be used. Rather, it need only know the feature name and the handling of different interface versions occurs transparently within the access class 114, 116.

Figure 2:
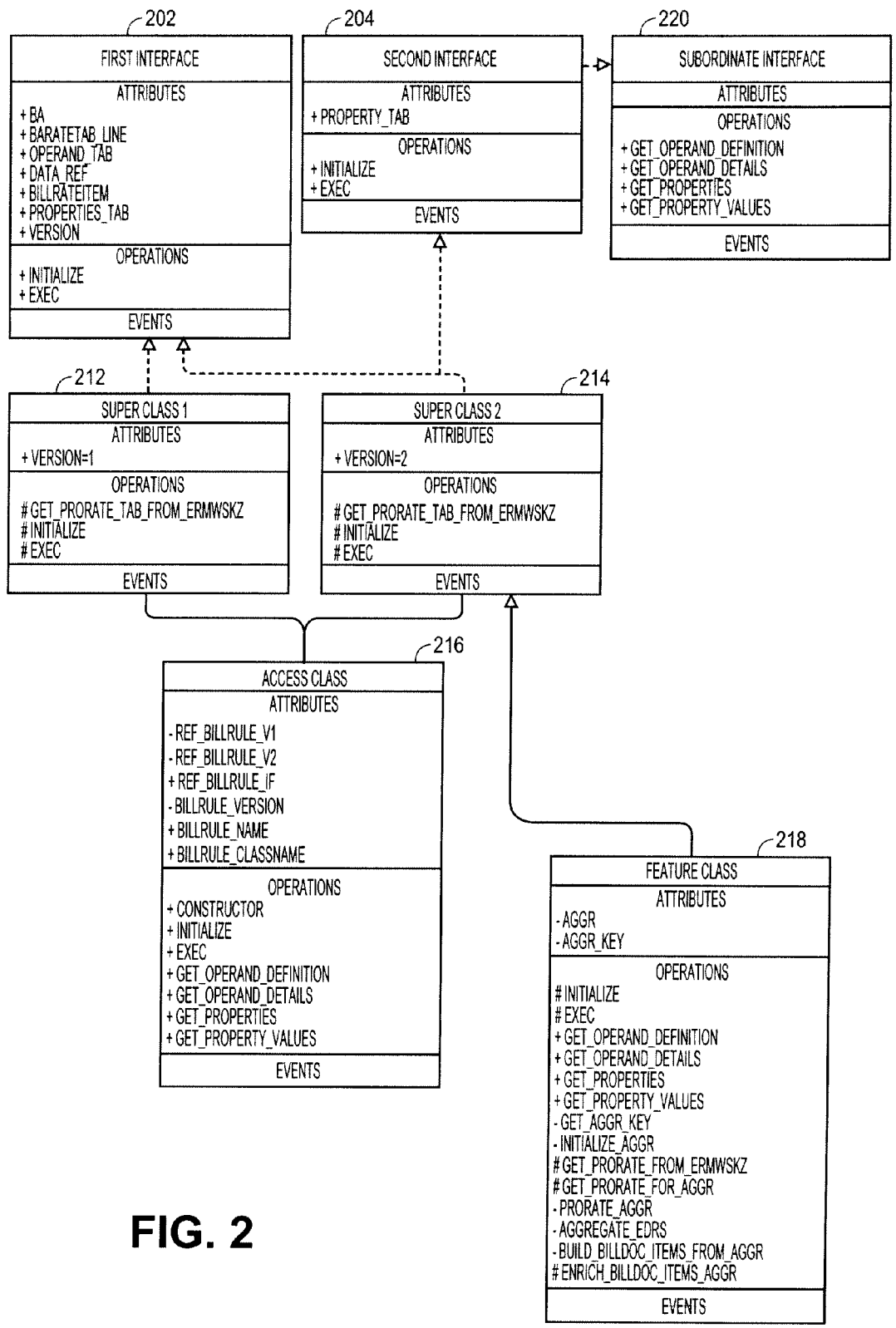
FIG. 2 is a class diagram of a system of one embodiment of the invention.

FIG. 2 is a class diagram of a system of one embodiment of the invention. The diagram appears in the context of a billing system having a number of billing rules. As billing rules change, changes to the interfaces become necessary.

A first super class 212 implements a first interface 202. First super class includes the static attribute "version=1", which provides a version designation for super class 212. Later in time, additional features may be added that are not provided for in first interface 202. Thus, a second super class 214 may be deployed to implement both first interface 202 and second interface 204. The second super class 214 has a static attribute "version=2" to provide a version designation for the second super class 214. Second interface 204 may implement a subordinate interface 220 to provide additional methods to users of the second interface 204.

For purposes of expandability it is within the scope and contemplation of embodiments of the invention to have, for example, a third super class that implements a first through third interface up to an nth super class implementing a first through nth interface. This serves to provide great extensibility in modular design. Because each user interface is permitted to add new methods and parameters without accounting for backward compatibility and without requiring accessing components (end users) to know anything about the versioning design flexibility and simplicity are greatly increased.

An access class 216 identifies which super class supports a feature requested by an interface caller, e.g., an application (not shown). Access class 216 instantiates a feature class object 218 and calls the method requested by the application.

The access class contains all method of all supported interfaces. Each method checks the version of the instantiated feature object. If the feature is available in the interface implementation, the feature can be called. Otherwise, the access class 216 throws an exception that may be caught by the caller.

Feature class 218 is derived from one of the super classes (here super class$_2$ 214) and therefore implicitly implements methods from an appropriate version of interface. Because feature class inherits a version designation from a corresponding super class, the access class can identify which super class to use in accessing the interfaces 202, 204.

Stated slightly differently to provide a concrete example outside of the billing context, super class$_2$ 214 may be a generic instance of the class "animal." One feature may, for example, be the same for all "animals," e.g., "running" thus "animal" may provide a running method that, e.g., "cat" and "dog" both derive from "animal." Therefore neither "cat" nor "dog" need to implement "running" each time. Feature class 218 may represent, e.g., "dog" which implements the interface "animal" and provides special methods, e.g., barking for animal's generic method "make noise." The access class 216 requests feature "dog" instantiates 218 and calls "make noise." Feature class 218 responds with a bark because that is the way "dog" provides make noise.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
implementing, on a platform, a first interface by a first super class having a first version designation;
implementing, on the platform, both the first interface and a second interface by a second super class having a second version designation, wherein the second interface is a subsequent version of the first interface and not backward compatible therewith, and wherein the first super class and the second super class are different super classes;
instantiating, on the platform, an access class to identify an interface to use having compatibility with an interface caller and to access the identified interface via the first super class or the second super class all transparently to the interface caller;
passing a name of a feature class to the access class via a constructor of the access class, wherein the feature class uses the identified interface; and
checking a version designation of the feature class.

2. The method of claim 1 further comprising:
calling a method with a set of parameters corresponding to the version designation of the feature class if the feature class is supported; and
throwing an exception if the feature class is not supported.

3. The method of claim 1 further comprising:
defining the first version designation as a static attribute of the first super class and the second version designation as a static attribute of the second super class.

4. The method of claim 3 further comprising:
deriving a feature class from the second super class to inherit the second version designation to the feature class.

5. An apparatus comprising:
a first interface associated with a first version designation;
a second interface associated with a second version designation, wherein the second interface is a subsequent version of the first interface and not backward compatible therewith;
a set of feature objects derived from a super class implementing the first interface;
an access class encapsulating a member of the set of feature objects, wherein the access class instantiates the member of the set of feature objects when a name of the member of the set of feature objects is received by the access class, wherein the second interface is implemented by the super class and accessible by the access class, and wherein the access class identifies a feature object version designation and accesses the first interface or the second interface based on the feature object version designation independently from a caller of the access class;
a constructor to instantiate the access class;
an application to use the member of the set of feature objects, wherein the application passes the name of the member of the set of feature objects to the constructor; and
a platform on which the application, the first interface, and the second interface reside.

6. A non-transitory machine-accessible medium containing instructions that when executed cause a machine to:
implement, on a platform, a first interface by a first super class having a first version designation;
implement, on the platform, both the first interface and a second interface by a second super class having a second version designation, wherein the second interface is a subsequent version of the first interface and not backward compatible therewith, and wherein the first super class and the second super class are different super classes;
instantiate, on the platform, an access class to identify an interface to use having compatibility with an interface caller and to access the identified interface via the first super class or the second super class all transparently to the interface caller;
pass a name of a feature class to use the identified interface to the access class via a constructor of the access class; and check a version designation of the feature class.

7. The non-transitory machine-accessible medium of claim 6 further comprising instructions causing the machine to:
call a method with a set of parameters corresponding to the version designation of the feature class if the feature class is supported; and
throw an exception if the feature class is not supported.

8. The non-transitory machine-accessible medium of claim 6 further comprising instructions causing the machine to:
define the first version designation as a static attribute of the first super class and the second version designation as a static attribute of the second super class.

9. The non-transitory machine-accessible medium of claim 8 further comprising instructions causing the machine to:
derive a feature class from the second super class to inherit the second version designation to the feature class.

* * * * *